(12) United States Patent
D'Souza et al.

(10) Patent No.: US 8,051,597 B1
(45) Date of Patent: Nov. 8, 2011

(54) SCOUT SNIPER OBSERVATION SCOPE

(75) Inventors: Clifford Clark D'Souza, National City, CA (US); Paul Amadeo, San Diego, CA (US); Allen E. Ripingill, Jr., Turners Falls, MA (US)

(73) Assignee: Cubic Corporation, San Diego, CA (US)

( * ) Notice: Subject to any disclaimer, the term of this patent is extended or adjusted under 35 U.S.C. 154(b) by 479 days.

(21) Appl. No.: 12/138,227

(22) Filed: Jun. 12, 2008

Related U.S. Application Data

(60) Provisional application No. 60/934,648, filed on Jun. 14, 2007.

(51) Int. Cl.
*F41G 1/38* (2006.01)

(52) U.S. Cl. .............. 42/119; 42/111; 342/45; 398/108; 356/3

(58) Field of Classification Search ............ 42/111, 42/119, 120, 142; 89/41.06, 41.07; 356/3, 356/4, 4.02, 4.03, 4.08, 5.04, 8, 9, 11, 7, 356/614, 616
See application file for complete search history.

(56) References Cited

U.S. PATENT DOCUMENTS

| | | | |
|---|---|---|---|
| 3,989,942 A | 11/1976 | Waddoups | |
| 4,054,794 A | 10/1977 | Laughlin et al. | |
| 4,097,155 A * | 6/1978 | Appert | 356/141.5 |
| 4,136,956 A | 1/1979 | Eichweber | |
| 4,143,263 A | 3/1979 | Eichweber | |
| 4,249,265 A | 2/1981 | Coester | |
| 4,695,161 A * | 9/1987 | Reed | 356/254 |
| 4,731,879 A | 3/1988 | Sepp et al. | |
| 4,847,481 A | 7/1989 | Altmann | |
| 4,866,781 A | 9/1989 | Borken et al. | |
| 4,937,795 A | 6/1990 | Motegi et al. | |
| 5,026,158 A * | 6/1991 | Golubic | 356/252 |
| 5,142,288 A | 8/1992 | Cleveland | |
| 5,166,507 A | 11/1992 | Davis et al. | |
| 5,241,314 A | 8/1993 | Keeler et al. | |
| 5,274,379 A | 12/1993 | Carbonneau et al. | |
| 5,299,227 A | 3/1994 | Rose | |
| 5,329,467 A | 7/1994 | Nagamune et al. | |
| 5,426,295 A | 6/1995 | Parikh et al. | |
| 5,448,045 A | 9/1995 | Clark | |
| 5,448,847 A | 9/1995 | Teetzel | |
| 5,459,470 A | 10/1995 | Wootton et al. | |
| 5,476,385 A | 12/1995 | Parikh et al. | |
| 5,648,862 A | 7/1997 | Owen | |
| 5,686,722 A | 11/1997 | Dubois et al. | |
| 5,819,164 A | 10/1998 | Sun et al. | |
| 5,822,713 A * | 10/1998 | Profeta | 701/302 |
| 5,870,215 A | 2/1999 | Milano et al. | |
| 5,966,226 A | 10/1999 | Gerber | |

(Continued)

FOREIGN PATENT DOCUMENTS

EP    1154532 A    11/2001

(Continued)

*Primary Examiner* — Benjamin P Lee
(74) *Attorney, Agent, or Firm* — Kilpatrick Townsend & Stockton LLP

(57) ABSTRACT

A method and system for an observation system for use in weapon aiming is disclosed. An observation scope displays azimuth and elevation adjustments. Meteorological information is gathered by one or more weather stations, which use weather sensors. A range finder determines a distance between the observation scope and a target. A ballistics processor determines a ballistic solution based on the distance and the meteorological information. The ballistic solution is provided to the observation scope.

26 Claims, 9 Drawing Sheets

U.S. PATENT DOCUMENTS

| | | | |
|---|---|---|---|
| 5,966,227 A | 10/1999 | Dubois et al. | |
| 5,978,141 A | 11/1999 | Karwacki | |
| 5,986,790 A | 11/1999 | Ota et al. | |
| 6,097,330 A | 8/2000 | Kiser | |
| 6,154,299 A | 11/2000 | Gilbreath et al. | |
| 6,219,596 B1 | 4/2001 | Fukae et al. | |
| 6,239,901 B1 | 5/2001 | Kaneko | |
| 6,247,259 B1 * | 6/2001 | Tsadka et al. | 42/114 |
| 6,450,816 B1 | 9/2002 | Gerber | |
| 7,308,202 B2 | 12/2007 | Roes et al. | |
| 7,394,528 B2 * | 7/2008 | Hinchliff et al. | 356/5.02 |
| 7,414,707 B2 * | 8/2008 | LaBelle et al. | 356/6 |
| 7,489,865 B2 | 2/2009 | Varshneya et al. | |
| 7,654,029 B2 * | 2/2010 | Peters et al. | 42/111 |
| 7,675,609 B2 * | 3/2010 | Hinchliff et al. | 356/5.02 |
| 7,690,145 B2 * | 4/2010 | Peters et al. | 42/111 |
| 7,720,388 B2 | 5/2010 | Varshneya et al. | |
| 7,738,082 B1 * | 6/2010 | Peters | 356/4.01 |
| 7,739,823 B2 * | 6/2010 | Shapira et al. | 42/114 |
| 2001/0013835 A1 * | 8/2001 | Hsu et al. | 340/905 |
| 2001/0017724 A1 | 8/2001 | Miyamoto et al. | |
| 2001/0035995 A1 | 11/2001 | Ruggiero | |
| 2002/0089729 A1 | 7/2002 | Holcombe | |
| 2003/0072343 A1 | 4/2003 | William et al. | |
| 2003/0082502 A1 * | 5/2003 | Stender et al. | 434/23 |
| 2004/0020099 A1 * | 2/2004 | Osborn, II | 42/122 |
| 2004/0075880 A1 | 4/2004 | Pepper et al. | |
| 2005/0021282 A1 * | 1/2005 | Sammut et al. | 702/150 |
| 2005/0268521 A1 * | 12/2005 | Cox et al. | 42/130 |
| 2006/0010760 A1 * | 1/2006 | Perkins et al. | 42/142 |
| 2006/0201047 A1 | 9/2006 | Lowrey, III | |
| 2006/0274300 A1 * | 12/2006 | Hinchliff et al. | 356/5.02 |
| 2007/0234626 A1 * | 10/2007 | Murdock et al. | 42/126 |
| 2008/0100822 A1 * | 5/2008 | Munro | 356/4.01 |
| 2008/0163536 A1 * | 7/2008 | Koch et al. | 42/111 |
| 2008/0231829 A1 * | 9/2008 | Hinchliff et al. | 356/4.01 |
| 2009/0205239 A1 * | 8/2009 | Smith, III | 42/122 |
| 2009/0320348 A1 * | 12/2009 | Kelly | 42/119 |

FOREIGN PATENT DOCUMENTS

| | | |
|---|---|---|
| EP | 1286440 A | 2/2003 |
| EP | 1748273 A1 | 1/2007 |
| FR | 2681143 A | 12/1993 |
| WO | WO97/37193 A | 10/1997 |
| WO | WO2005/050254 A | 6/2005 |

* cited by examiner

SCOUT SNIPER OBSERVATION SCOPE

This application claims the benefit of and is a non-provisional of co-pending U.S. Provisional Application Ser. No. 60/934,648 filed on Jun. 14, 2007, which is hereby expressly incorporated by reference in its entirety for all purposes.

BACKGROUND

This disclosure relates in general to weapons systems and, but not by way of limitation, to scout or sniper observation scopes.

Conventional observation scopes are used to view a target some distance away. Magnification or zoom is used to optically enlarge the scene being viewed. In some cases, a laser range finder can be used to determine distance to a target. Additionally, laser designators can be used to mark a target for incoming ordinance. Optical combat identification systems (OCIDS) can also be used to identify friend or foe.

Although these systems work well in most environments, they have neither technical capability nor ballistic fidelity to provide sufficient ballistic solutions. Snipers and gunners are not only required to hold a steady aim while sighting their targets, they're also bound by necessity to follow advanced marksmanship techniques; estimate range, estimate atmospheric conditions, estimate target posture; calculate a firing solution; and correctly adjust sights and accurately lead moving targets.

Projectiles that travel over long distances through various atmospheric conditions ultimately drift off course from their original trajectory. The visual point of aim is, as a rule, slightly different from the actual point of impact of a projectile. A weapon sight can be properly adjusted to match the expected point of impact. If the weapon's sighting mechanism is properly adjusted, and the weapon has been properly stabilized, the projectile should impact very close to the point of aim.

Long range interdiction techniques have been well established to increase the likelihood of acquiring, engaging, and hitting distant targets. To ensure that projectiles hit their intended targets, shooters and observers make observations to gather information about their targets posture and position, and to estimate atmospheric conditions. This data is inserted into a ballistic formula to compute a firing solution. Necessary adjustments are made to the weapon sights or fire control system. The shifted point of aim is intended to pair up with the estimated point of impact. On ground weapon platforms the gunner establishes may establish a "hold" for static targets or "lead" for moving targets. These techniques permit shooters to hit their intended targets with a high degree of accuracy.

SUMMARY

In one embodiment of the invention, an observation system for use in weapon aiming is disclosed. An observation scope displays azimuth and elevation adjustments. Meteorological information is gathered by one or more weather stations, which have weather sensors. A range finder determines a distance between the observation scope and a target. A ballistics processor determines a ballistic solution based on the distance and the meteorological information. The ballistic solution is provided to the observation scope.

In another embodiment of the invention, an observation system for use in weapon aiming is disclosed. The observation system includes an observation scope, a range finder, an eyepiece, a weather sensor, a ballistic processor and a display. The range finder is aligned with aim of the observation scope to measure a distance between the observation scope and a target. The eyepiece is configured for viewing of an image of the target that is collected by the observation scope. The weather sensor is configured to gather meteorological information. The ballistic processor determines a ballistic solution based, at least in part, on the meteorological information and the distance, wherein the ballistic solution includes a azimuth adjustment and an elevation adjustment. The display shows the azimuth adjustment and the elevation adjustment, wherein the display is viewable with the eyepiece.

In yet another embodiment of the invention, a method for operating an observation scope for weapon aiming is disclosed. In one step, meteorological information is electronically received. A distance between an observation scope and a target is determined. An image of the target is collected by the observation scope and the image is visible through an eyepiece. Meteorological information is determined along with a ballistic solution, which accounts for the meteorological information and the distance. The azimuth adjustment and the elevation adjustment are shown through the eyepiece.

In still another embodiment of the invention, an observation system for use in weapon aiming is disclosed. The observation scope includes an observation scope, a range finder, an eyepiece, a weather sensor, a ballistic processor, and a display. The range finder is aligned with aim of the observation scope to measure a distance between the observation scope and a target. The eyepiece is configured for viewing of an image of the target that is collected by the observation scope. The weather sensor is configured to gather meteorological information. The ballistic processor determines a ballistic solution based, at least in part, on the meteorological information and the distance. The ballistic solution includes a azimuth adjustment and an elevation adjustment. The ballistic processor is integral to the observation scope. The display shows the azimuth adjustment and the elevation adjustment.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
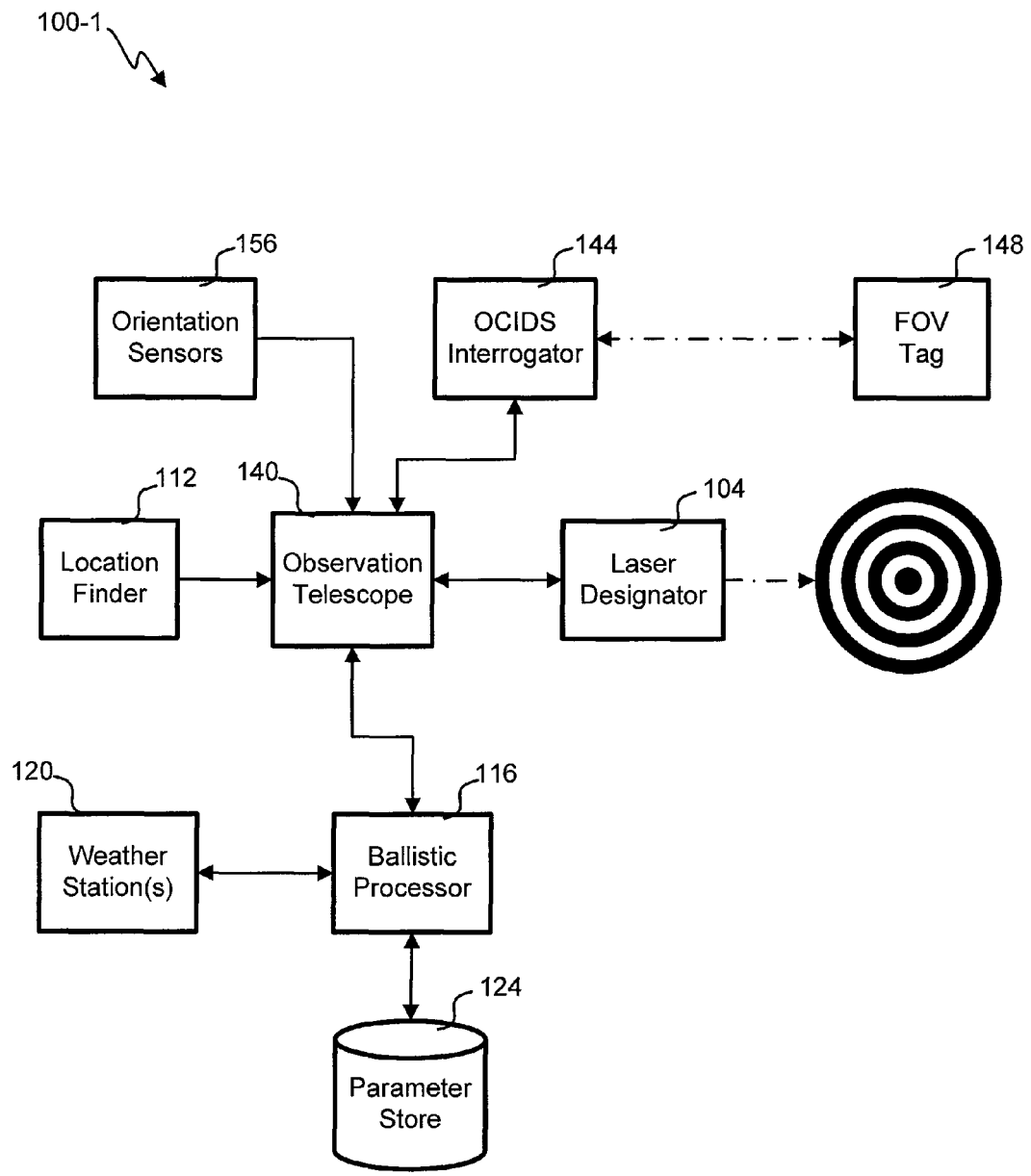
FIGS. 1A through 1D depict block diagrams of embodiments of an observation system.

Referring first to FIG. 1A, a block diagram of an embodiment of an observation system 100-1 is shown. This embodiment of the observation system 100-1 automatically determines a ballistic solution using various information. A scout or sniper uses the observation system 100-1 to correct aim of a weapon (not shown). The weapon has azimuth and elevation adjustments to adjust aim of the weapon based upon the conditions. The round used in the weapon is factored into the determination of the ballistic solution.

An observation telescope 104 allows viewing in a typically magnified way, a distant target. The target could be a combat, training or hunting target. The observation telescope 104 could be, for example, mounted on a tripod or the weapon. Various embodiments have various options mounted to the observation telescope 140, but generally there is a mechanism to determine distance or range from to the target from the weapon and/or the observation telescope 104 along with a way to automatically gather meteorological information.

The distance to the target and the meteorological information is used to determine a ballistic solution automatically. A switch, button or other mechanism on the observation telescope 104 or elsewhere in the observation system 100-1 can trigger or re-trigger calculation of the ballistic solution. This embodiment produces a ballistic solution in one second or less from the time of triggering.

The observation telescope 140 has ability to display certain status information that includes at least the azimuth and elevation adjustments to make according to the ballistic solution. The display (not shown) could be viewable through an eyepiece of the observation telescope 140, with a integral display elsewhere on the observation telescope 140, and/or on a display separate from the observation telescope 140.

This embodiment has the capability to designate a target remotely. The designation can be relative to a location of the observation telescope or not. A laser designator 104 is aligned with the line-of-sight of the observation telescope 140 to illuminate the target such that a local weapon or remote weapon can fire at the illumination point. Often a non-visible wavelength is used by the laser designator 104 to avoid the target knowing of the designation. Through the observation scope 140 the wavelength is visible. Other parties with equipment sensitive to the wavelength can see the illumination point to aim their weapon. Additionally, certain ordinances can guide themselves to the illumination point.

A location finder 112 is coupled to the observation telescope 140 in this embodiment to determine location. With the location of the observation telescope 140 and a range to the target and orientation information, the location of a target point can be automatically determined. This target point can be electronically communicated to allow calling in weapons fire to that target point without it needing to be visible. Indeed, the laser designator 104 is not needed when electronically designating the target point. This electronic designation can be input into guided ordinances that are directed toward the target point.

This embodiment includes one or more orientation sensors 156 that are affixed to the observation telescope 140. Azimuth and elevation are determined with an inclinometer and digital compass before communication to the observation telescope 140 and/or the ballistic processor 116. The orientation can be used in electronically designating the target point and/or determination of a ballistic solution.

Friend or foe interrogation is performed with an optical combat identification system (OCIDS) in this embodiment. Friendly equipment and/or personnel uses a field-of-view FOV tag 148 affixed externally. An OCIDS interrogator 144 sends laser light at the target. If a FOV tag 148 is close by, it will return the laser light in the same direction. Some embodiments of the FOV tag 148 can modulate the laser light that is returned with a code to indicate a friend. Where no laser light is returned and/or where the code is incorrect, the target is designated unknown or possibly a foe. The display can present this conclusion such that the scout or sniper can observe the conclusion.

Additionally, the OCIDS interrogator 144 can send information encoded on the laser light. The FOV tag 148 can decode the information to receive information from the OCIDS interrogator 144. Modulation by the FOV tag 148 allows sending information back to the OCIDS interrogator 144. In this way, bi-directional, free-space optical communication is possible in this embodiment.

Range to the target along the line-of-sight is determined by laser ranging in this embodiment. Other embodiments could use other ranging techniques or accept a manually entered estimate from the scout or sniper. Either the OCIDS interrogator 144 or the laser designator 104 could have a range determine capability. The range can be used in determining the target point and/or the ballistic solution.

A ballistic processor 116 is used to determine ballistic solutions. In one embodiment, the ballistic processor 116 could be implemented in an off-the-shelf personal digital assistant (PDA) or other handheld computing device. Another embodiment integrates the ballistics processor into the observation telescope 140. Software in the ballistic processor 116 accepts manually entered parameters such as weapon type and round information. Automatically gathered ranging, orientation and meteorological information can also be manually entered at the option of the scout or sniper. The gathered parameters used to determine the ballistic solution are retained in a parameter store 124 that is implemented with a storage medium. Gathered parameters include wind speed, wind direction, temperature, barometric pressure, humidity, range to target, slope angles, elevation, azimuth, and/or location.

The ballistic solution is displayed for the sniper or scout in this embodiment. In other embodiments, a voice synthesizer could be used to indicate the adjustment, for example, it could indicate "two clicks right" and "four clicks down." The display could be anywhere, but in this embodiment it is visible through the eyepiece of the observation telescope 140. Other embodiments, could have the display separate from the observation telescope 104, for example, a personal digital assistant (PDA), digital watch, head-mounted display or any handheld device could display the ballistic solution. The ballistic solution is a azimuth value or adjustment and a elevation drop or adjustment. The sniper enters these adjustments to his or her crosshairs manually in this embodiment. In other embodiments, the crosshairs could be automatically adjusted.

One or more weather stations 120 are used in this embodiment to gather meteorological information automatically. Parameters such as wind direction, wind speed, barometric pressure, temperature, and/or humidity are gathered by the weather stations 120. The various meteorological sensors could be in an integrated weather station or could be spread among a number devices. A weather station 120 could be integral or removably mounted to the observation telescope 140. Other embodiments could separate the weather station and wired or wirelessly communicate with the rest of the observation system 100. A tripod could be used to mount the weather station 120 or it could be handheld. The weather station 120 wirelessly sends information to the ballistic processor 116, but could use a wired interface as a back-up or the sole interface.

Some embodiments can account for varying meteorological information between the weapon and the target can be accounted for in the ballistic solution. The location of each weather station 120 relative to the line-of-sight of the observation telescope 140 can be determined and used in the ballistic solution. For example, a crosswind to the left of the line-of-sight at ten meters as gathered by a first weather station may be partially offset by a rightward crosswind fifty meters out that is determined by a second weather station. This embodiment gathers the meteorological information from the various weather stations and determines a ballistic solution relative to the aim point of the observation telescope 140.

Figure 1B:
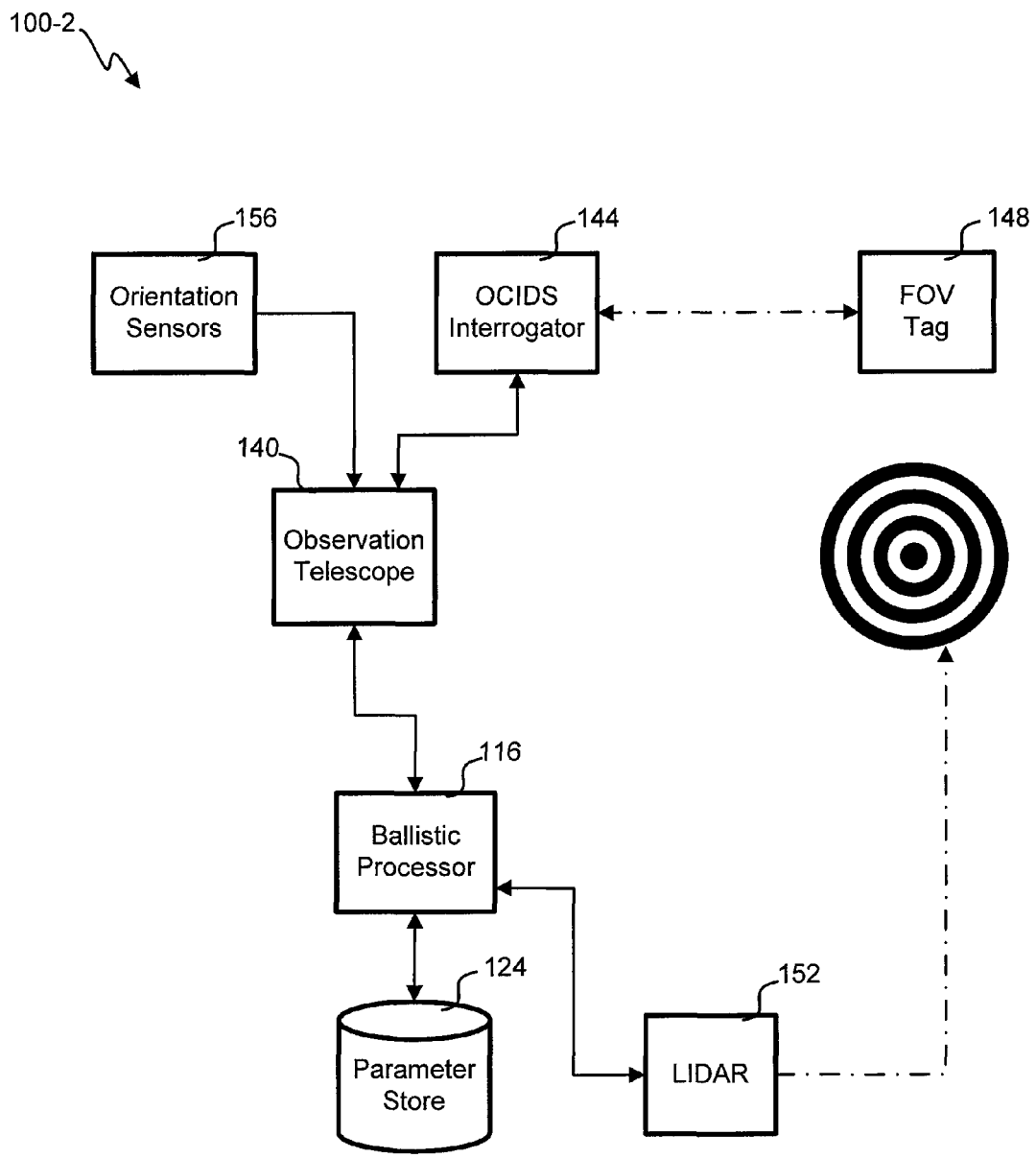

With reference to FIG. 1B, a block diagram of another embodiment of an observation system 100-2 is shown. Unlike the embodiment of FIG. 1A, this embodiment does not use laser designation. Instead of weather stations 120, laser induced differential absorption radar (LIDAR) 152 is used in this embodiment. Range from the observation telescope 140 to the target can be determined with either the OCIDS interrogator 144 or the LIDAR 152.

LIDAR 152 sends laser light along the line-of-sign of the observation telescope 140. Analysis of the laser light as it interacts with the atmosphere along the line-of-sight allows determining the meteorological information. The LIDAR 152 passes the meteorological information to the ballistic processor 116. Additionally, the LIDAR can be used for determining range to the target in some embodiments.

Figure 1C:
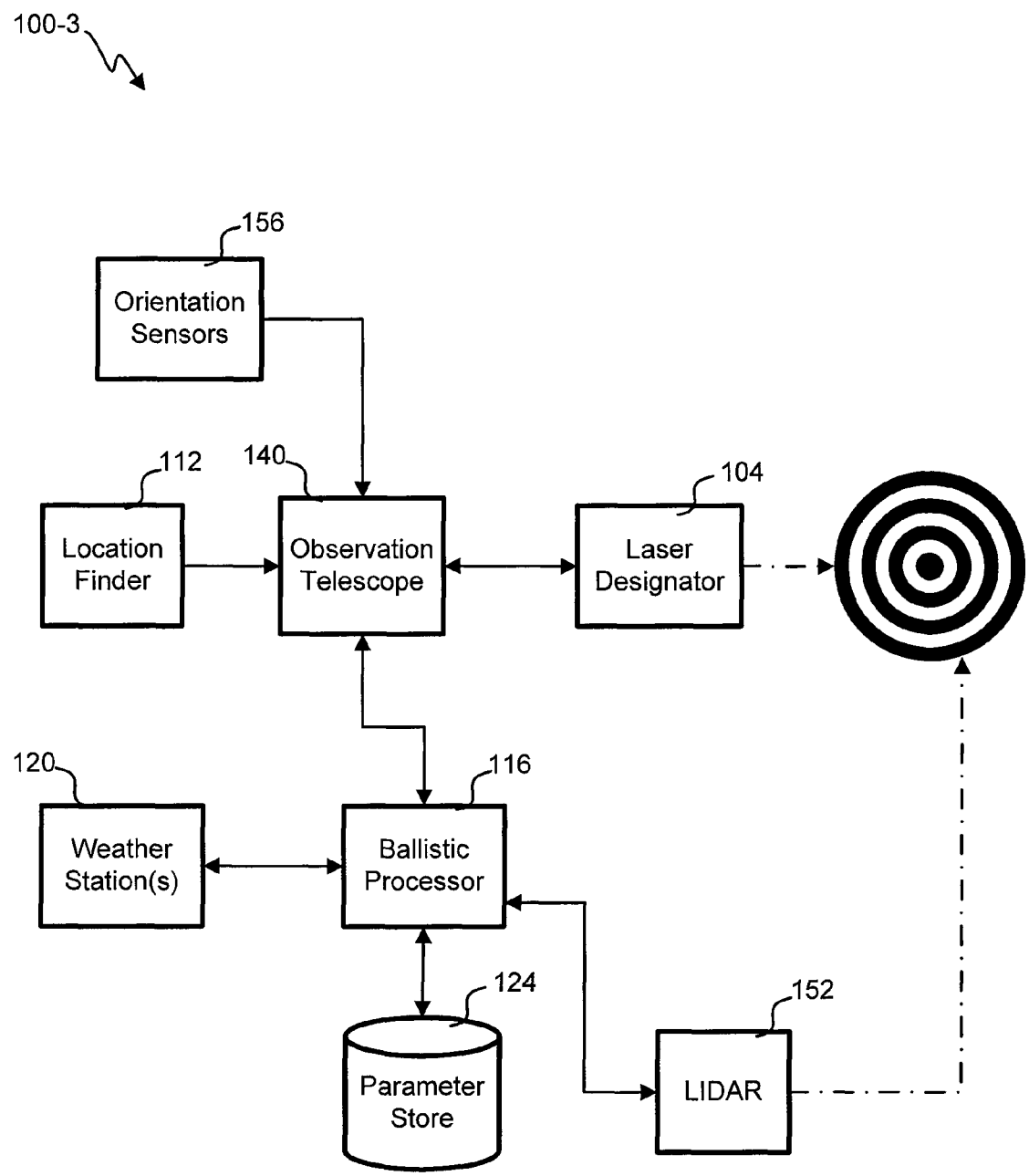

Referring next to FIG. 1C, a block diagram of yet another embodiment of an observation system 100-3 is shown. This embodiment is capable of laser designation like the embodiment of FIG. 1A. Unlike the embodiment of FIG. 1A, this embodiment does not have OCIDS capability. This embodiment has both weather station(s) 120 and LIDAR 152. The LIDAR 152 can be used for ranging. Meteorological information can be gathered by one or both of the weather station 120 and LIDAR 152. Some parameters may be gathered by one and others gathered by the other. An algorithm in the ballistic processor 116 can choose which component to use or how to average the two in computing the ballistic solution.

Figure 1D:
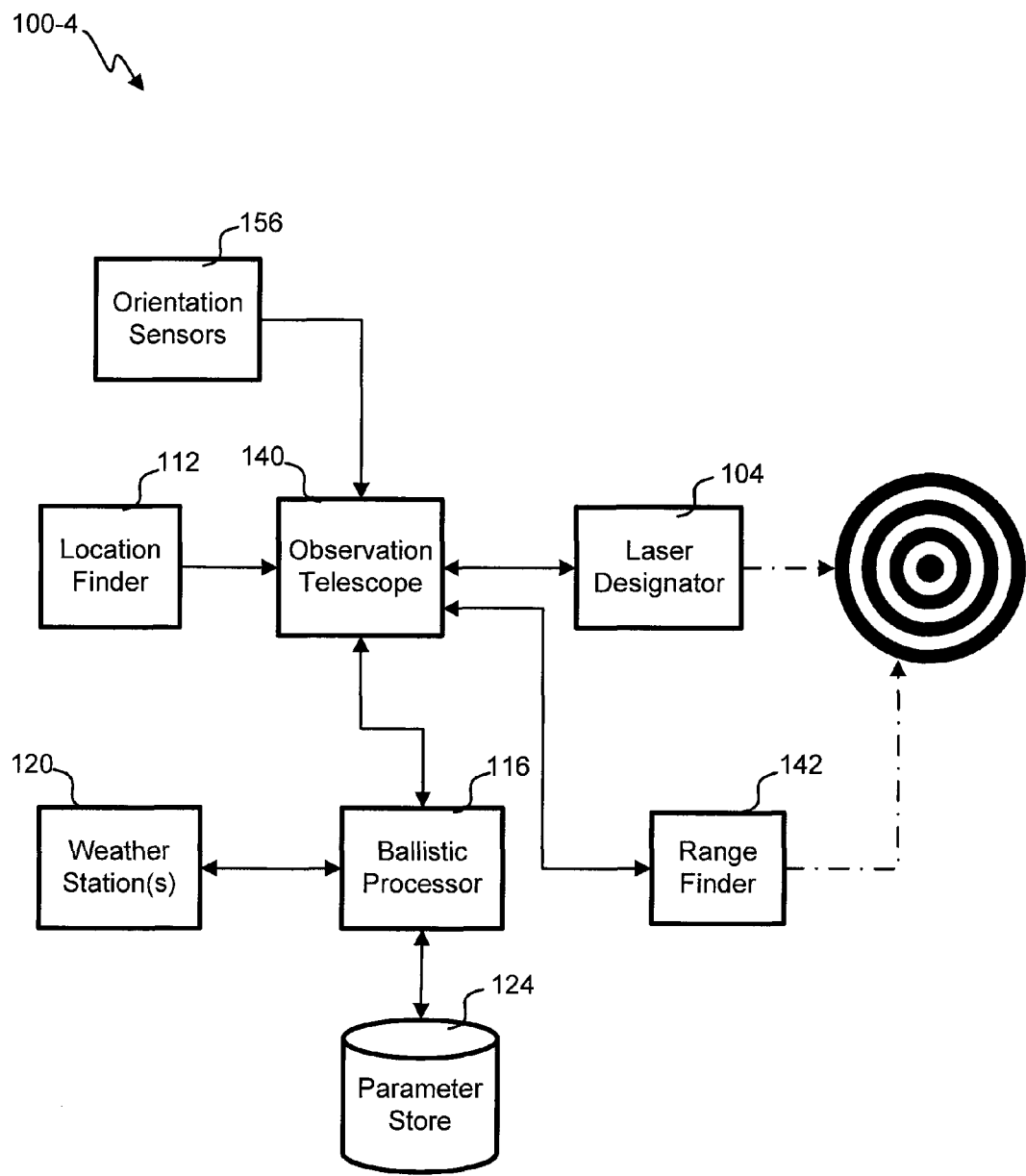

With reference to FIG. 1D, a block diagram of still another embodiment of an observation system 100-4 is shown. This embodiment has laser designation like the embodiments of FIGS. 1A and 1C. Weather stations 120 are used to gather meteorological information. Unlike the other depicted embodiments, this embodiment uses a range finder 142 to determine the distance along the line-of-sight to the target. The range finder 142 could use laser or sonic signals to determine distance.

Figure 2A:
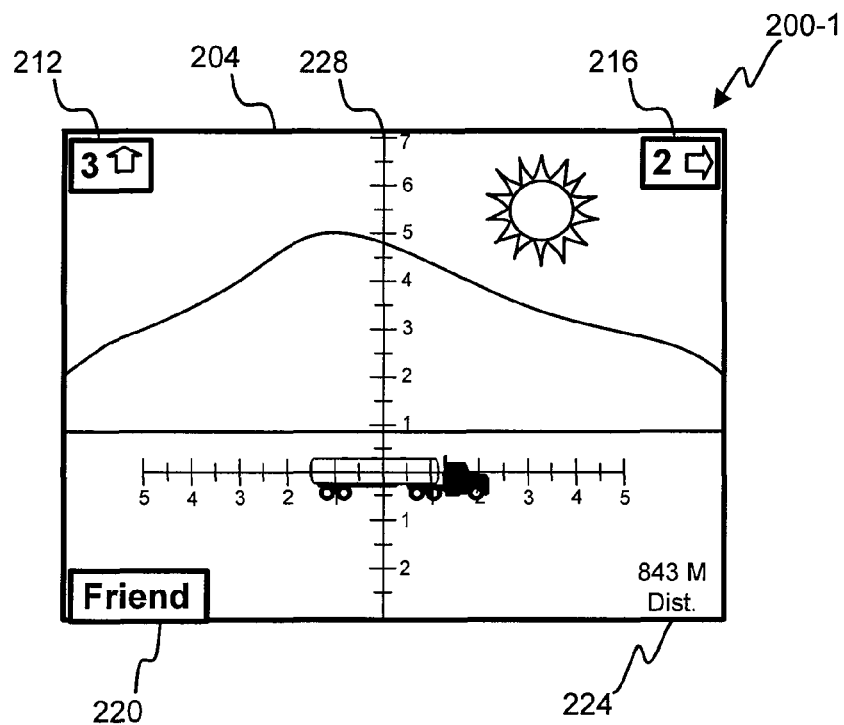
FIGS. 2A through 2D illustrate embodiments of an image visible through a viewfinder of an observation telescope.

Referring next to FIG. 2A, an embodiment of an image 200-1 visible through a viewfinder of an observation telescope 140 is shown. Part of the image 200 shows a target scene 204, which could be directly relayed through optics or could be displayed on a screen for indirect viewing of the target. In this embodiment, the observation telescope 140 uses an electronic display to show the image and other information. This embodiment includes an elevation adjustment 212, a azimuth adjustment 216, a friend or foe status 220, and a range 224 to target along the aim point as the other information shown on the image 200. The elevation and azimuth adjustments 212, 216 are produced by the ballistic processor as the ballistic solution. Friend or foe status 220 and/or the range 224 are optional in other embodiments. The scout or sniper can see the display information through the eyepiece of the observation telescope 140.

Figure 2B:
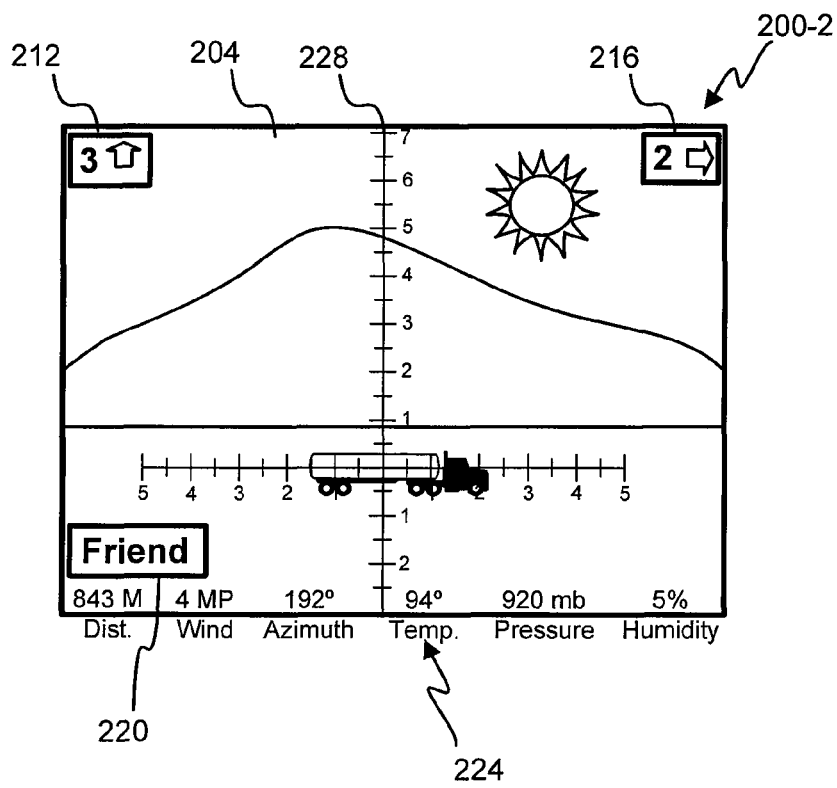

With reference to FIG. 2B, another embodiment of the image 200-2 visible through a viewfinder of an observation telescope 140 is shown. This embodiment includes several items as status information 224. Specifically, the distance to the target, wind, azimuth, temperature, barometric pressure, and humidity are all displayed. Some embodiments allow programming what status information 224 is displayed or not.

Figure 2C:
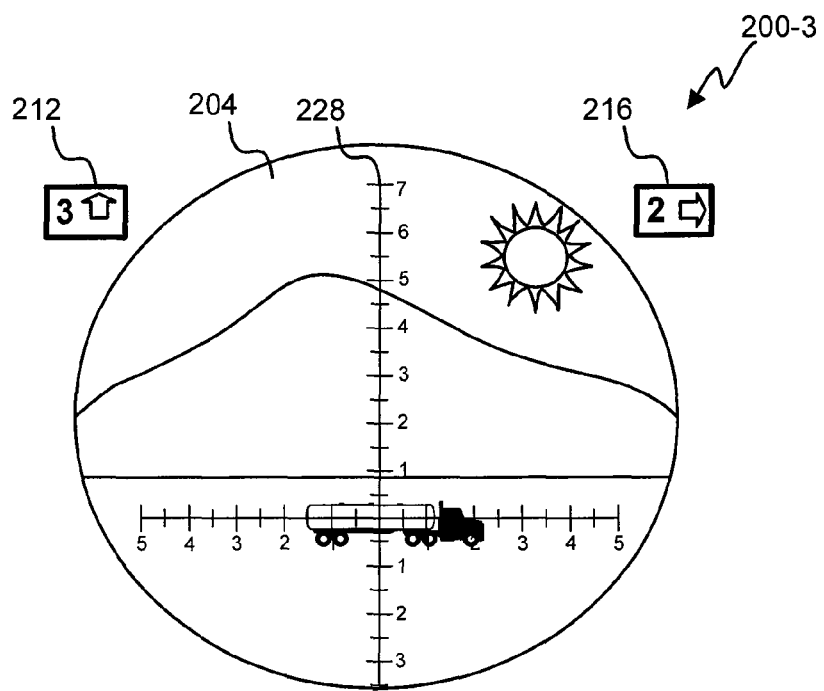

Referring next to FIG. 2C, yet another embodiment of the image 200-3 visible through a viewfinder of an observation telescope 140 is shown. The image 200-3 in this embodiment is a composite of the optically gathered view around the target, crosshairs 228 and turret adjustments 212, 216. The turret adjustments originate from an electronic display that overlays the optically gathered view. The turret adjustments can be shown on light emitting diode (LED) display, liquid crystal display (LCD), organic LCD (OLED), organic LED (OLED), or other types of displays.

Figure 2D:
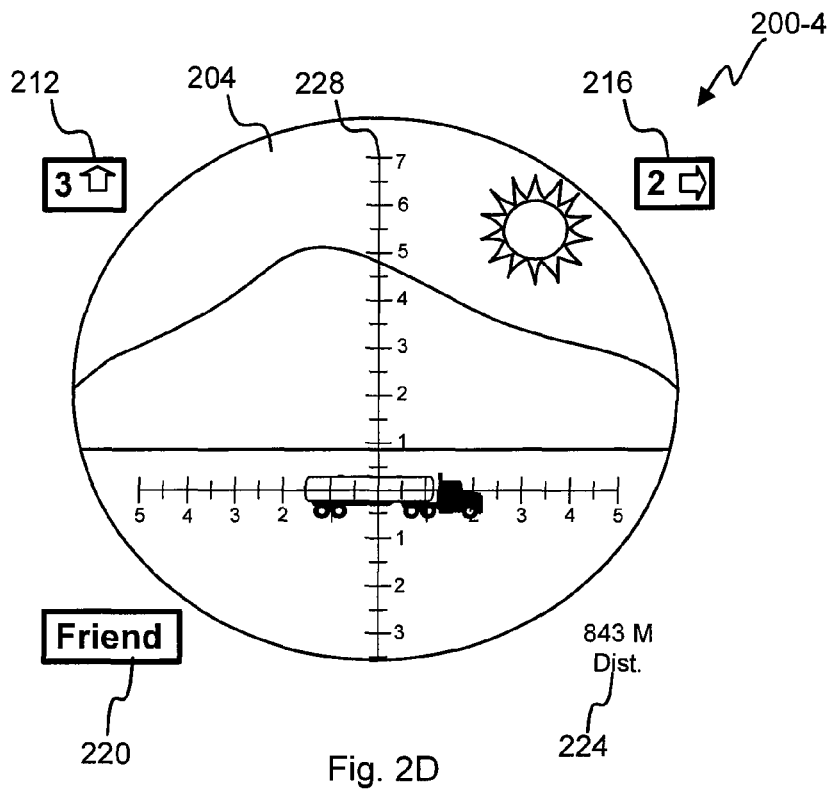

With reference to FIG. 2D, still another embodiment of the image 200-4 visible through a viewfinder of an observation telescope 140 is shown. This embodiment includes an elevation adjustment 212, a azimuth adjustment 216, a friend or foe status 220, and a range 224 to target along the aim point as the other information shown on the image 200. The electronically displayed information is visible through an eyepiece or viewfinder of the observation telescope 140.

Figure 3:
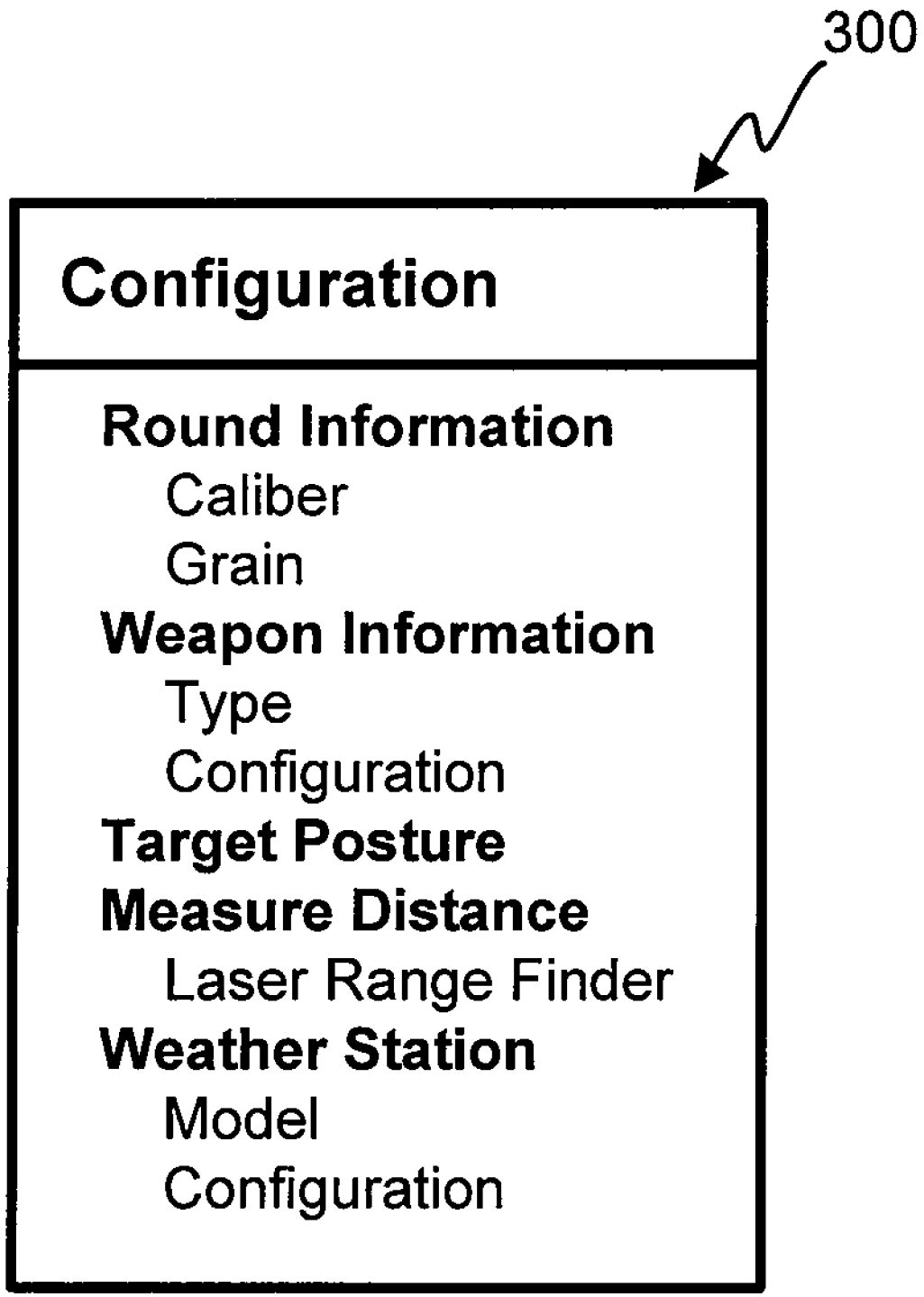
FIG. 3 illustrates an embodiment of a configuration interface to a ballistics processor.

With reference to FIG. 3, an embodiment of an interface 300 to a ballistics processor 116 is shown. This interface 300 could be on the observation telescope, visible through the eyepiece, on a separate device, or elsewhere in the observation system. The scout or sniper can interact with the interface 300 using a keypad (not shown) to enter parameters used by the ballistic processor 116 in producing the ballistic solution. Items such as round information, movement of target and weapon information can be entered by the scout or sniper using the interface 300. Additionally, this embodiment allows configuring the range finder and weather stations.

Figure 4A:
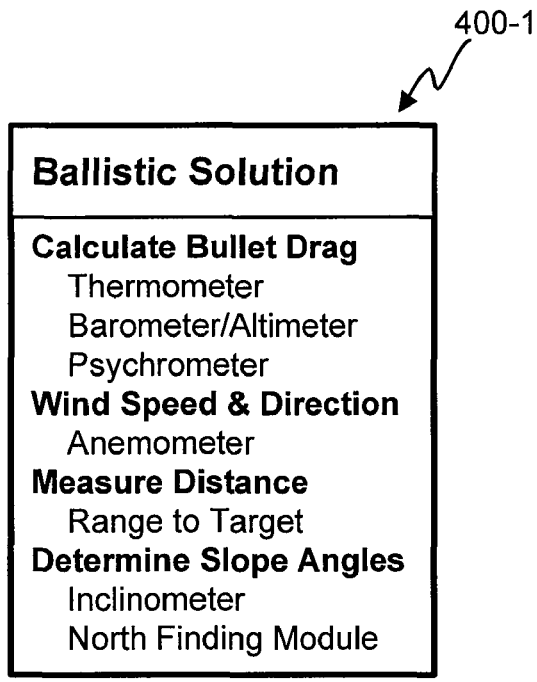
FIGS. 4A and 4B illustrate embodiments of a ballistic interface to the ballistics processor.
Figure 4B:
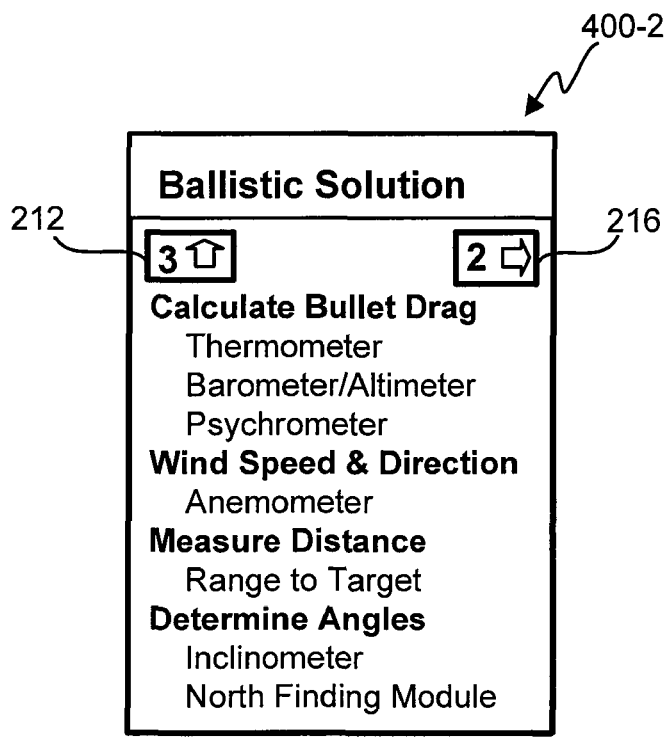

Referring next to FIGS. 4A & 4B, embodiments of a ballistic interface 400 are shown. The scout or sniper can interact with the ballistic interface 300 using a keypad (not shown) to see the automatically gathered parameters used by the ballistic processor 116 in producing the ballistic solution. The automatically gathered parameters can be overridden by manual entry by the scout or sniper. Manually entered parameters can fill in missing information or override automatically gathered parameters. The embodiment of FIG. 4B differs from that of FIG. 4A in that the elevation and azimuth adjustments 212, 216 for the ballistic solution are displayed.

Figure 5:
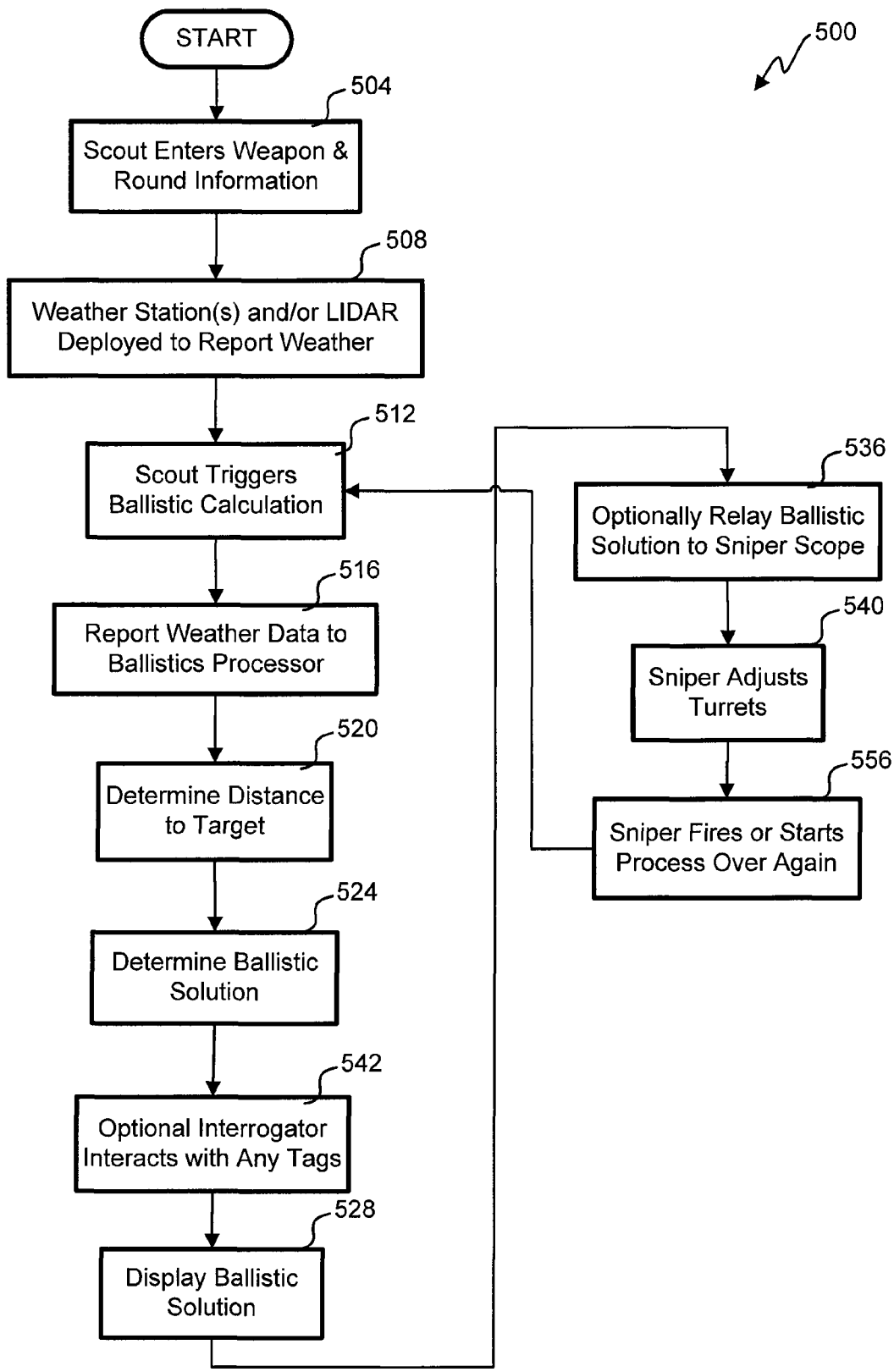
FIG. 5 illustrates a flowchart of an embodiment of a process for operating an observation telescope.

Referring next to FIG. 5, a flowchart of an embodiment of a process 500 for operating an observation telescope 140 is shown. The depicted portion of the process begins in block 504, where the scout or sniper enters any parameters manually, for example, round information, weapon information, trajectory of target, etc. In block 508, weather reporting components are configured and deployed. The observation telescope 140 is typically put on a tri-pod or weapon and aimed toward the target.

The ballistics calculation is triggered by the scout or sniper in block 512. Readings from the weather station(s) 120 and/or LIDAR 152 are performed and reported in block 516. Other embodiments continually collect this information rather than waiting for a triggering event. The range finder 142 is used to determine the distance to the aim point in block 520. The ballistic solution is determined in block 524 by the ballistic processor 116.

The OCIDS interrogator 144 detects any FOV tags 148 in block 542. Not all observation systems 100 have OCIDS capability such that block 542 can be skipped for those embodiments. Other embodiments could use other combat identification systems. In block 528, the ballistic solution is displayed with the scout scope along with any other information the display is capable of showing. In embodiments that have a weapon scope separate from the observation telescope 140, the ballistic solution and any other information can be relayed in block 536 to the weapon scope for display in addition to or as an alternative to display with a scout scope.

In block 540, the sniper uses the ballistic solution to make adjustments to the aim of the weapon. Turret adjustments allow for changing azimuth and elevation such that the crosshairs or reticle move. Some embodiments could automatically move the crosshairs according to the ballistic solution. Once the weapon is properly adjusted according to the ballistic solution, the sniper can fire the weapon accurately in block 556. If firing is not advisable, the process can loop from block 556 back to block 512 to acquire a new ballistic solution and possibly fire later.

A number of variations and modifications of the disclosed embodiments can also be used. Some embodiments describe use of the current invention with scoped sniper rifles, but other embodiments could use any type of weapon, for example, a rocket launcher, a tank, a canon, a howitzer, a torpedo, a vehicle mounted gun, or any other projectile fired on a battlefield. The observation scope functionality could be integral to a scope on a weapon. The azimuth and elevation adjustments could be shown through the scope eyepiece. Some embodiments could display the azimuth and elevation adjustments on a display on the observation scope and not through the eyepiece.

The various observation system components could be arranged in different ways in various embodiments. Some components could be mounted to the observation telescope or arranged separately. Communication could be wired or wireless between the components in various embodiments.

While the principles of the disclosure have been described above in connection with specific apparatuses and methods, it is to be clearly understood that this description is made only by way of example and not as limitation on the scope of the disclosure.

What is claimed is:

1. An observation system for use in weapon aiming, the observation system comprising:
    an observation scope;
    a range finder aligned with aim of the observation scope to measure a distance between the observation scope and a target;
    an eyepiece configured for viewing of an image of the target that is collected by the observation scope;
    an optical free-space communication transmitter configured to:
        send laser light;
        receive the laser light;
        conclude whether the received laser light has been modulated with a certain code; and
        present the conclusion;
    a weather sensor configured to gather meteorological information;
    one or more orientation sensors configured to:
        determine an orientation of the observation scope, and output orientation data;
    a ballistic processor that determines a ballistic solution based, at least in part, on the meteorological information, the orientation data, and the distance, wherein the ballistic solution includes a azimuth adjustment and an elevation adjustment; and
    an adjustment indicator configured to relay the azimuth adjustment and the elevation adjustment to a user.

2. The observation system for use in weapon aiming as recited in claim 1, wherein the distance is determined with a laser range finder.

3. The observation system for use in weapon aiming as recited in claim 1, wherein the adjustment indicator is configured to provide an audible indication to the user.

4. The observation system for use in weapon aiming as recited in claim 1, wherein the adjustment indicator comprises a display viewable through the eyepiece.

5. The observation system for use in weapon aiming as recited in claim 1, wherein the adjustment indicator is separate from the observation scope.

6. The observation system for use in weapon aiming as recited in claim 1, wherein the meteorological information is gathered local to the observation scope and remote to the observation scope.

7. The observation system for use in weapon aiming as recited in claim 1, wherein the meteorological information is gathered at a plurality of locations.

8. The observation system for use in weapon aiming as recited in claim 1, wherein the ballistic processor is integral to the observation scope.

9. The observation system for use in weapon aiming as recited in claim 1, wherein the ballistic processor resides with a handheld computer.

10. The observation system for use in weapon aiming as recited in claim 1, wherein the weather sensor is integral to the observation scope.

11. The observation system for use in weapon aiming as recited in claim 1, wherein the distance is determined with laser induced differential absorption radar (LIDAR).

12. The observation system for use in weapon aiming as recited in claim 1, wherein a weather station includes the weather sensor and wirelessly communicates the meteorological information.

13. The observation system for use in weapon aiming as recited in claim 1, wherein the weather sensor uses LIDAR to determine the meteorological information.

14. The observation system for use in weapon aiming as recited in claim 1, further comprising a weapon mount configured to affix the observation scope to be generally aligned with aim of a weapon.

15. The observation system for use in weapon aiming as recited in claim 1, further comprising a transmission media to couple the azimuth adjustment and the elevation adjustment to a weapon assembly separate from the observation scope.

16. The observation system for use in weapon aiming as recited in claim 1, further comprising an optical free space communication transmitter.

17. A method for operating an observation scope for weapon aiming, the method comprising steps of:
    sending laser light;
    receiving the laser light;
    concluding whether the received laser light has been modulated with a certain code; and
    presenting the conclusion;
    electronically receiving meteorological information;
    determining a distance between an observation scope and a target;

displaying an image of the target that is collected by the observation scope, wherein the image is visible through an eyepiece;

determining meteorological information;

determining orientation data indicative of an orientation of the observation scope;

determining a ballistic solution accounting for the meteorological information, the orientation data, and the distance; and showing the azimuth adjustment and the elevation adjustment through the eyepiece.

18. The method for operating the observation scope for weapon aiming as recited in claim 17, wherein the step of determining the distance comprises a step of using LIDAR to optically determine the distance.

19. The method for operating the observation scope for weapon aiming as recited in claim 17, wherein the step of determining meteorological information comprises a step of analyzing light properties between the observation scope and the target using LIDAR.

20. The method for operating the observation scope for weapon aiming as recited in claim 17, further comprising a step of transmitting the azimuth adjustment and the elevation adjustment to a weapon assembly.

21. The method for operating the observation scope for weapon aiming as recited in claim 17, further comprising a step of marking the target for indirect fire.

22. An observation system for use in weapon aiming, the observation system comprising:

an observation scope;

a range finder aligned with aim of the observation scope to measure a distance between the observation scope and a target;

an eyepiece configured for viewing of an image of the target that is collected by the observation scope;

an optical free-space communication transmitter configured to:
send laser light;
receive the laser light;
conclude whether the received laser light has been modulated with a certain code; and
present the conclusion;

a weather sensor configured to gather meteorological information;

one or more orientation sensors configured to:
determine an orientation of the observation scope, and output orientation data;

a ballistic processor that determines a ballistic solution based, at least in part, on the meteorological information, the orientation data, and the distance, wherein:
the ballistic solution includes a azimuth adjustment and an elevation adjustment, and
the ballistic processor is integral to the observation scope; and a display showing the azimuth adjustment and the elevation adjustment.

23. The observation system for use in weapon aiming as recited in claim 22, wherein the display is viewable through the eyepiece.

24. The observation system for use in weapon aiming as recited in claim 22, wherein the display is separate from the observation scope.

25. The observation system for use in weapon aiming as recited in claim 22, wherein the weather sensor is integral to the observation scope.

26. The observation system for use in weapon aiming as recited in claim 22, wherein the distance is determined with LIDAR.

* * * * *